United States Patent [19]
Husted et al.

[11] Patent Number: 5,887,029
[45] Date of Patent: Mar. 23, 1999

[54] METHOD OF SCHEDULING SPATIALLY SEPARATED CONTROL EVENTS WITH AN INDUSTRIAL CONTROLLER

[75] Inventors: Raymond R. Husted, Mentor; Charles M. Rischar, Chardon; Ronald E. Schultz, Solon; Kendal R. Harris, Mentor, all of Ohio

[73] Assignee: Allen-Bradley Company, LLC, Milwaukee, Wis.

[21] Appl. No.: 630,869

[22] Filed: Apr. 1, 1996

Related U.S. Application Data

[63] Continuation-in-part of Ser. No. 251,544, May 31, 1994, Pat. No. 5,519,726.

[51] Int. Cl.$^6$ ................................................. H04B 17/00
[52] U.S. Cl. .................... 375/224; 375/220; 375/356; 375/358; 370/103; 370/105; 370/13; 370/15; 364/131; 364/133; 364/134; 364/900
[58] Field of Search ...................... 375/224, 220, 375/356, 358; 370/13, 15, 14, 17, 103, 105; 364/131, 133, 134, 900

[56] References Cited

U.S. PATENT DOCUMENTS

| | | | |
|---|---|---|---|
| 4,876,664 | 10/1989 | Bittorf et al. | 364/900 |
| 4,937,777 | 6/1990 | Flood et al. | 364/900 |
| 5,479,618 | 12/1995 | Van De Steeg et al. | 364/167.01 |
| 5,636,124 | 6/1997 | Rischar et al. | 364/468.06 |

*Primary Examiner*—Stephen Chin
*Assistant Examiner*—T. Van Le
*Attorney, Agent, or Firm*—Keith M. Baxter; John M. Miller; John J. Horn

[57] ABSTRACT

A coordinated system time is established for spatially separated components of an industrial control system using synchronizing messages transmitted over a communication link between those parts. Precisely coordinated actions may be obtained at separated components by the use of a time conditional command received by those components prior to a time of execution the command instructing the component to execute the command only when at execution time in the future has been reached. The coordinated system time may be used to time stamp received triggering events for use in coordinating subsequent actions based on those triggering events.

11 Claims, 4 Drawing Sheets

METHOD OF SCHEDULING SPATIALLY SEPARATED CONTROL EVENTS WITH AN INDUSTRIAL CONTROLLER

This application is a continuation-in-part of U.S. application Ser. No. 08/251,544 filed May 31, 1994, now U.S. Pat. No. 5,519,726.

FIELD OF THE INVENTION

The present invention relates to industrial controllers for the real-time control of industrial processes, and in particular, to industrial controllers establishing a common time signal for coordinating actions among spatially separated functional modules.

BACKGROUND OF THE INVENTION

Industrial controllers are special purpose computers used for controlling industrial processes and manufacturing equipment. Under the direction of a stored program, the industrial controller examines a series of inputs, reflecting the status of the controlled process, and changes a series of outputs controlling the industrial process. The inputs and outputs may be binary, that is on or off, or analog reading or providing a value within a continuous range.

An industrial controller differs from a conventional computer in two respects. First, unlike a computer, an industrial controller is normally customized to the particular process it is controlling both by writing new control software, stored in the controller's memory, and by changing the hardware configuration of the controller itself. The ability to re-configure the hardware economically is provided by dividing the industrial controller into a number of functional modules each performing a different function. Different combinations of modules may be selectively linked together on a backplane or connected together via one or more communication links. The modules may include, for example, processors, power supplies, communication interfaces and input and output (I/O) modules. Each module generally incorporates a microprocessor and related circuitry and operates according to a local stored program.

An industrial controller also differs from a computer in that the various components of an industrial controller may be separated by a considerable distance over an expanse of a large factory or manufacturing operation. The separated functional modules communicate via digital messages transmitted over the communication links which provide input and output information. Multiple communication links may be joined by "bridges" or "relays" which serve to translate messages from a first link to the format and according to the protocol of the second link.

Precise coordination of actions between separated functional modules of a large industrial controller is difficult. One particularly demanding application is the measurement and control of electrical waveforms at spatially separate points, either for motor control or for the characterization of electrical power. Here, control resolution on the order of a few microseconds is necessary. Yet even with high speed communication links, the time required to arbitrate for control of the communication link for transmission of a coordinating message, and the time required to translate a message between the different communication links that may separate the modules, via one or more bridges, may far exceed this desired precision.

SUMMARY OF THE INVENTION

The present invention provides a method of precise coordination of separated components of an industrial control system. First a synchronized time-base is established over the entire industrial control system using a series of clocks synchronized by messages transmitted over the communication link joining the industrial controller with its I/O modules. Second, special "time conditional instructions" are predelivered to the I/O modules for execution at a future time referenced to the time-base rather than to the time of receipt of the instruction.

Similarly, a precise delay between a triggering event and a subsequent control action is obtained by recording the time from the time-base when the triggering event is detected and "time stamping" a message to the industrial controller. The controller then forwards a time conditional instruction to a second I/O module, the time conditional instruction holding the sum of this time stamp and a predetermined delay interval.

Specifically, the present invention provides a method of executing control actions with an industrial controller at an execution time value T with great precision. This precision is obtained even though the I/O modules at which the actions occur are spatially separated by a communication link having a variable transmission delay D. In the method a synchronized coordinated system time-base (CST) is generated providing a substantially identical system time value at each of the I/O modules. The industrial controller then transmits on the communication link to at least two I/O modules a time conditional command holding the execution time value T. The first and second I/O modules are programmed to perform the predetermined control actions only after receiving the time conditional commands but not until the system time value has attained a predetermined mathematical relationship to the execution time value T.

Typically the predetermined mathematical relationship is that the system time value equals or is greater than the execution time value T.

Thus, it is one object of the invention to provide a method of precisely coordinating actions in an industrial controller despite the delay intrinsic to its interconnecting communication link. Under the present method, the control messages are sent in advance and triggered by a particular system time value and hence moderate delay in the communication link is of no consequence.

It is similarly an object of the invention to provide a method precisely coordinating events in an industrial controller where communication delays on the communication link are unpredictable and variable. In theory, a predictable communication link delay can be accommodated simply by sending command messages a precise amount in advance of their desired execution times. This approach, however, does not work if the communication delay is variable and unpredictable. In contrast, the present invention allows coordination of events in an industrial controller with great precision despite uncertainty in the transmission delay of the command signals, provided the command signals are forwarded to the I/O modules at a time prior to the maximum amount of variable delay in the communication link.

At the time of sending the time conditional commands, the controller may verify that they will arrive at the I/O modules prior to their execution time by comparing the current coordinated system time with a known maximum communication link delay D. If the system time plus D is greater than the desired time of execution T, an error message may be provided to the user.

Thus, it is another object of the invention to provide a clear indication to the user when coordination of events will not be obtained as a result of communication link delay such as may be caused by the often unpredictable demands on the industrial controller incident to real-time control.

As mentioned, the coordinated system time-base may be created by providing a number of local clocks and synchronizing the local clocks by messages transmitted on the communication link.

Thus, it is another object of the invention to allow separation of timing functions from control functions. By creating separate timing signals (used exclusively to generate the coordinated system time-base) redundant timing information (implicit with control signals) may be eliminated, allowing the CST timing signals to be given scarce, high priority status on the communication link. This improves the CST accuracy. Lower priority status on the communication link may then be used for a large number of precisely coordinated control messages without overwhelming the communication links.

The present invention may coordinate a control action to be a predetermined interval after the occurrence of a triggering event. In one example, the control action is performed by a first I/O module and the triggering event is detected by a second I/O module spatially separated from the first I/O module on a communication link. The communication link has a variable transmission delay D. At the time of the triggering event, the second I/O module transmits on the communication link a time stamped message indicating the occurrence of the triggering event and containing a recorded system time value equal to the system time at the moment of detection of the triggering event. The controller, receiving the time stamped message, transmits to the first I/O module a time conditional command providing an execution time value T equal to the sum of the recorded system value and the predetermined interval I. As before, the first I/O module executes the control action only after receiving the time conditional command and after the system time value has obtained a predetermined mathematical relationship to the execution time value T. Normally the system time value is required to be equal to or greater than the execution time value T.

Thus, it is yet another object of the invention to enforce precise relationships between triggering events and control actions when the absolute time of the control action is not known in advance.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Industrial Controller Hardware

Figure 1:
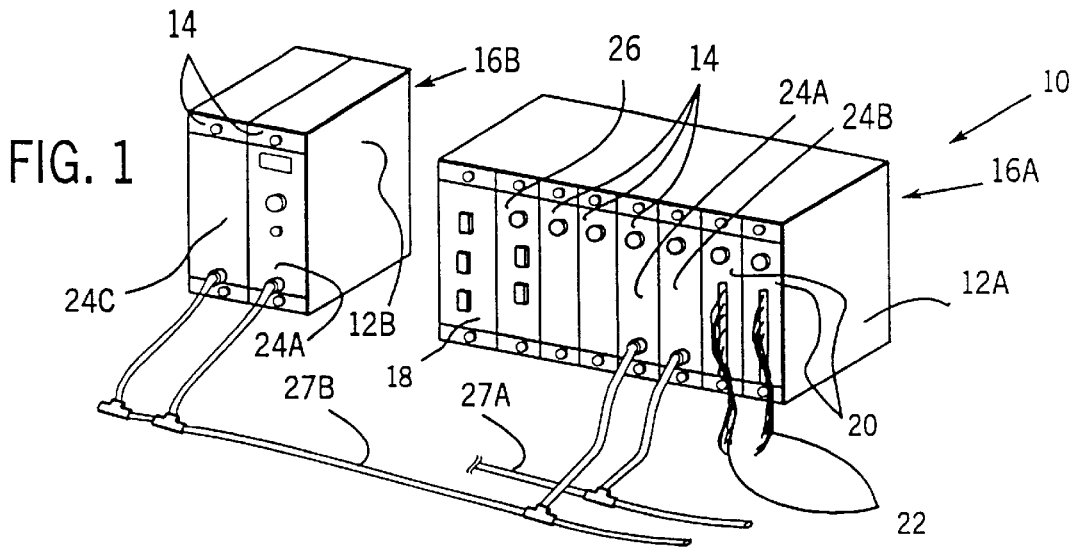
FIG. 1 is a perspective view of an industrial controller having multiple functional modules contained in several racks joined by communication links.

Referring to FIG. 1, an industrial controller 10 suitable for use with the present invention provides a first and second rack 12a and 12b for holding a number of functional modules 14 electrically interconnected by backplanes 16a and 16b running along the rear of the racks 12a and 12b respectively. Each module 14 may be individually removed from the rack 12a or 12b thereby disconnecting it from its respective backplane 16 as will be described below for repair or replacement and to allow custom configuration of the industrial controller 10.

The modules 14 within the rack 12a may include, for example, a power supply module 18, a processor module 26, two communication modules 24a and 24b and two I/O modules 20. Power supply module 18 receives an external source of power (not shown) and provides regulated voltages to the other modules 14 by means of conductors on the backplane 16a.

I/O modules 20 provide an interface between inputs from, and outputs to external equipment (not shown) via cabling 22 attached to the I/O modules 20 at terminals on their front panels. As is understood in the art, the I/O modules 20 convert input signals on the cables 22 to digital words for transmission on the backplane 16a. The I/O modules 20 also convert other digital words from the backplane 16a to the necessary signal levels for control of equipment.

Figure 3:
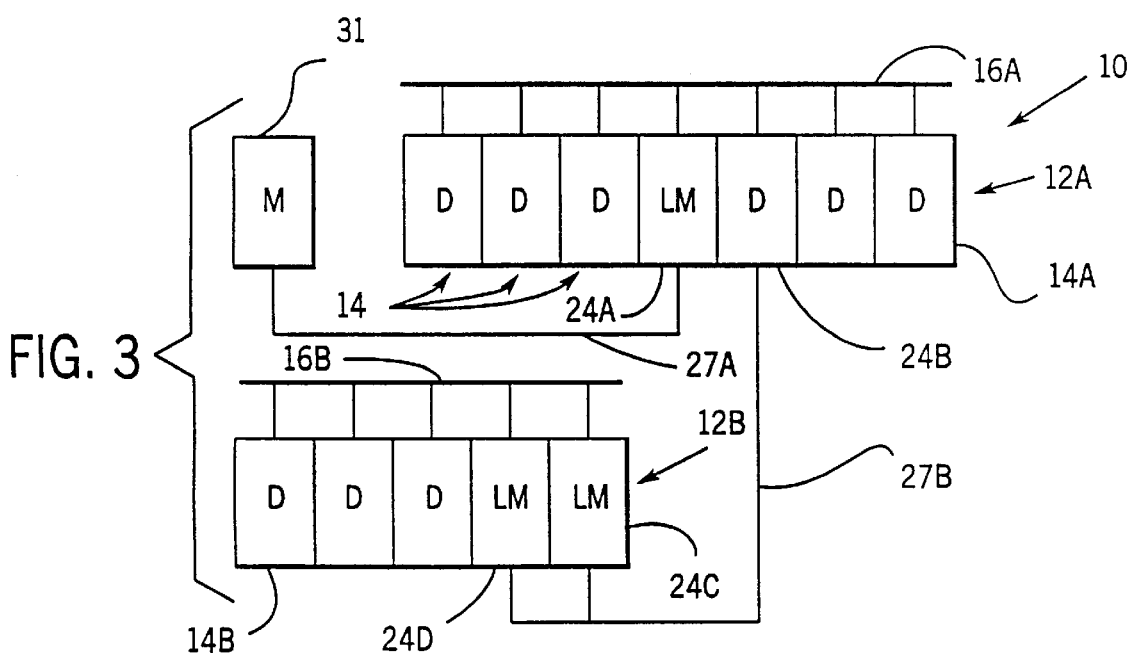
FIG. 3 is a pictorial representation of the interlinking of the various functional modules of the industrial controller of FIG. 1 showing their division according to their modes into master, local master, and dependent modes.

The communication modules 24a and 24b provide a similar interface between the backplane 16 and one of two external high speed communication links 27a and 27b. The high speed communication links 27a and 27b may connect with other modules 14 or with remote racks of I/O modules 20 or the like, as will be described. Referring also to FIG. 3, in the present example, high speed interface 27a connects communication module 24b with a remote time-master module 31 whose function will be described, whereas high speed communication link 27b connects with communication module 24a with communication modules 24c and 24d in rack 12b.

The processor module 26 processes information provided by the communication modules 24 and the I/O modules 20 according to a stored program and provides output information to the communication module 24 and the I/O modules 20 in response to that stored program and receive input messages.

Figure 2:
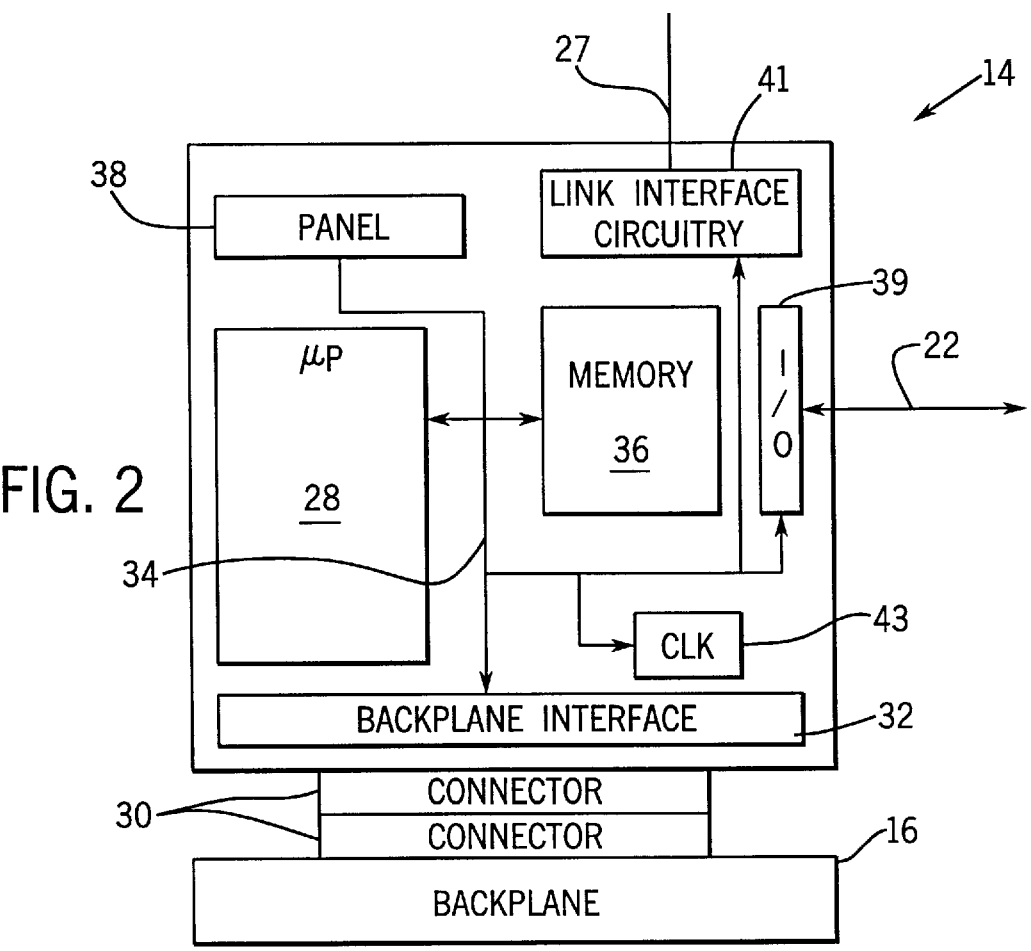
FIG. 2 is a block diagram of a single functional module of FIG. 1 showing its connection to a common backplane and communication links to communicate with other modules.

Referring now to FIGS. 1 and 2, each functional module 14, is attached to the backplane 16 by means of a separable electrical connector 30 that permits the removal of the module 14 from the backplane 16 so that it may be replaced or repaired without disturbing the other modules 14. The backplane 16 provides the module 14 with both power and a communication channel to the other modules 14.

Local communication with the other modules 14 through the backplane 16 is accomplished by means of a backplane interface 32 which electrically connects the backplane 16 through connector 30. Backplane interface 32 monitors messages on the backplane 16 to identify those messages intended for the particular module 14, based on a message address being part of the message and indicating the message's destination. Messages received by the backplane interface 32 are conveyed to an internal bus 34 in the module 14.

The internal bus 34 joins the backplane interface 32 with a memory 36, a microprocessor 28, front panel circuitry 38, I/O interface circuitry 39 (if the module is an I/O module 20) and communication link interface circuitry 41 (if the module is a communication module 24). The microprocessor 28 may be a general purpose microprocessor providing for the sequential execution of instructions contained in memory 36 and the reading and writing of data to and from the memory 36 and the other devices associated with the internal bus 34.

The microprocessor 28 includes an internal clock circuit (not shown) providing the timing of the microprocessor 28 but may also communicate with an external precision clock 43 of improved precision. This clock 43 may be a crystal controlled oscillator or other time standard including a radio link to an NBS time standard. The precision of the clock 43 is recorded in the memory 36 as a quality factor.

The panel circuitry 38 includes status indication lights such as are well known in the art and manually operable switches such as for locking the module 14 in the off state.

The memory 36 holds programs executed by the microprocessor 28 to provide the functions as will be described and also variables and data necessary for the execution of those programs. For I/O modules 20, the memory 36 also includes an I/O table holding the current state of inputs and outputs received from and transmitted to the industrial controller 10 via the I/O modules 20.

Generation of a Coordinated System Time Signal

Referring now to FIG. 3, each functional module 14 for the purposes of establishing a system time common to all functional modules 14 may operate in one of up to three modes: time-master, local master or dependent. The time-master module 31 in the example of FIG. 3 designated by the letter "M" operates in a time-master mode and provides a coordinated system time signal ("CST") to all other functional modules 14 either directly through a high speed communication link 27a or indirectly through the agency of one or more relays as will be described.

In the preferred embodiment, the CST signal is a 64 bit value representing a counted number of microseconds from an arbitrary origin in time. The CST signal indicates the time value of the next microsecond tick of the microsecond clocks of each of receiving functional modules and thus ensures that each of the receiving modules has the same count value upon receipt of the CST message. In between CST signals, the modules 14 track the entire 64 bit count value internally relying on the CST messages only to correct any drift in this count value on a periodic basis.

There can be only one module 14 actively sourcing the CST value at any given time, as will be described below.

Communication module 24a designated by the letters "LM" in FIG. 3 receives the CST signal from communication link 27a and operates as a local master to forward it to a second communication channel of the backplane 16a for use by all the modules in rack 12a. Communication module 24b, in turn, receiving the CST signal from the backplane 16a, retransmits it to the high speed communication link 27b to be received by the communication modules 24c and 24d each also acting in a local master capacity to forward the CST message to backplane 16b. This dual local master state is temporary and must be resolved as will be described. Generally each communication module 24 may act as a bridge between different communication links either the high speed links 27 or the backplanes 16. A communication module 24 may be a local master of one or more links, for example, of both a back-plane 16 and a high speed link 27.

In the preferred embodiment, the CST signal is relatively infrequent to conserve the bandwidth of the communication links 27a and 27b and therefore the communication modules 24 in acting as local masters use their internal clocks to generate a more frequent resynchronizing signal for other modules 14 on the backplane 16. For example, the CST signal may be a message transmitted as infrequently as several times per second whereas the communication modules 24 acting as a local master may transmit on the backplane 16 a resynchronizing signal once every few microseconds based on their internal clocks updated from the CST signal. Thus modules 14 which may not have clocks sufficiently accurate to provide the correct time value count in between updates from the CST value are provided with more frequent updates derived from the synchronized clock of the local master communication module 24.

The remaining modules operate in a dependent mode, designated by the letter "D", in which they receive either the CST signal or a higher resolution resynchronizing signal keyed to the CST signal for use in carrying out instructions. All modules 14 may operate in a dependent mode; however, only certain modules may operate in local master or time-master modes as will be described.

Use of the Coordinated System Time

Figure 7:
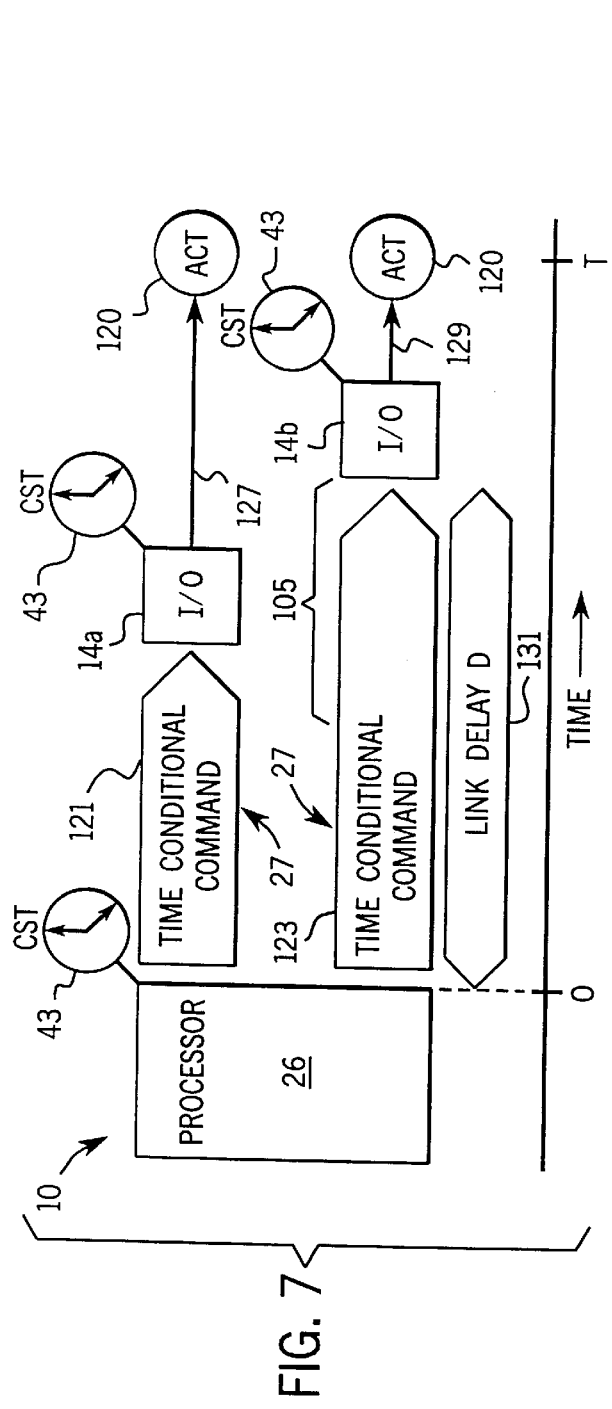
FIG. 7 is a schematic representation of an industrial controller with the elements plotted against time to show the passage of signals through its I/O modules and communication links when two events are to be coordinated to occur at time T.

Referring to FIG. 7, the coordinated system time may be used to ensure simultaneity of action between two or more modules 14A and 14B separated across communication links 27. In this use of the CST signal, different I/O modules 14A and 14B receive time conditional commands 121 and 123 to execute a certain action 120, for example, the starting of a motor or the sampling of a signal, at a common CST value T some time in the future.

Each I/O module 14A and 14B tracks the CST value by means of its internal clock 43, updated through the CST message or a message derived from the CST message, then independently executes the desired action 120 when the predetermined time T is equal to (or greater than) the CST value indicated on its internal clock 43. The amount of time I/O module 14A waits a time 127 after receiving message 121 and will generally be longer than the amount of time 129 delayed by the I/O module 14B after receiving message 123. These times 127 and 129 need not be computed by the I/O modules 14A and 14B but are the natural result of the coordination process.

In the example of FIG. 7, the time required to communicate the time conditional command 121 to module 14A may be substantially less than the time required to communicate the time conditional command 123 to module 14B. The difference 105 between these two times represents a limit to the degree of coordination of actions 120 in a normal industrial controller. Nevertheless, with the present invention, because each I/O module 14A and 14B may refer to a precisely synchronized clock 43 having a coordinated system time, far greater coordination may be obtained.

The uncertainty in the arrival time of messages 121 and 123 results in part from the desire to permit flexible network topologies in which the actual physical path that the messages take between different components of the industrial controller 10 may vary widely both in terms of cable length and number of intermediary communication modules 24 (bridges and relays) that must be traversed for the message delivery to be complete.

Even with simple network topologies, however, there can be considerable variation in the delivery time of messages as a result of the unpredictable length of queues of messages on links, variations in the availability of priority status the links and variations on link message traffic. In addition, the hardware of the industrial controller may impose arbitrary and often unpredictable delays in processing and transmitting information. The total delay of the communication link will be termed generally D and is represented by arrow 131 and includes a maximum expected difference 105 described above.

If at the time at which the controller transmits the time conditional commands 121 or 123, is greater than the desired execution time T plus the maximum communication link delay D then the controller may provide to user an error message indicating that actions 120 will not likely be performed with a high degree of coordination.

It should be noted that if the action 120 is to sample a particular value at a particular time T, when that value is returned via the communication links 27b and 16a to the processor module 26 it will be essentially "time stamped" by knowledge of the time T contained in the sampling instruction that caused the acquisition. Alternatively, the time of acquisition of the sample may be recorded and transmitted to the processor module 26 as an explicit time stamp.

If a series of samples at precise times are required, the time conditional command 121 or 123 may instruct the processor module 26 to executes the desired action 120 when the predetermined time T is equal to (or greater than) the CST value indicated on its internal clock 43 or when the CST value is equal to the predetermined time T plus and integer multiple of a predetermined sampling period, the latter being the desired time between samples or other periodic actions in the series of samples or actions. In this way a single time conditional command 121 or 123 may invoke a series of precisely coordinated actions at a remote module 14 with no additional network traffic.

Figure 8:
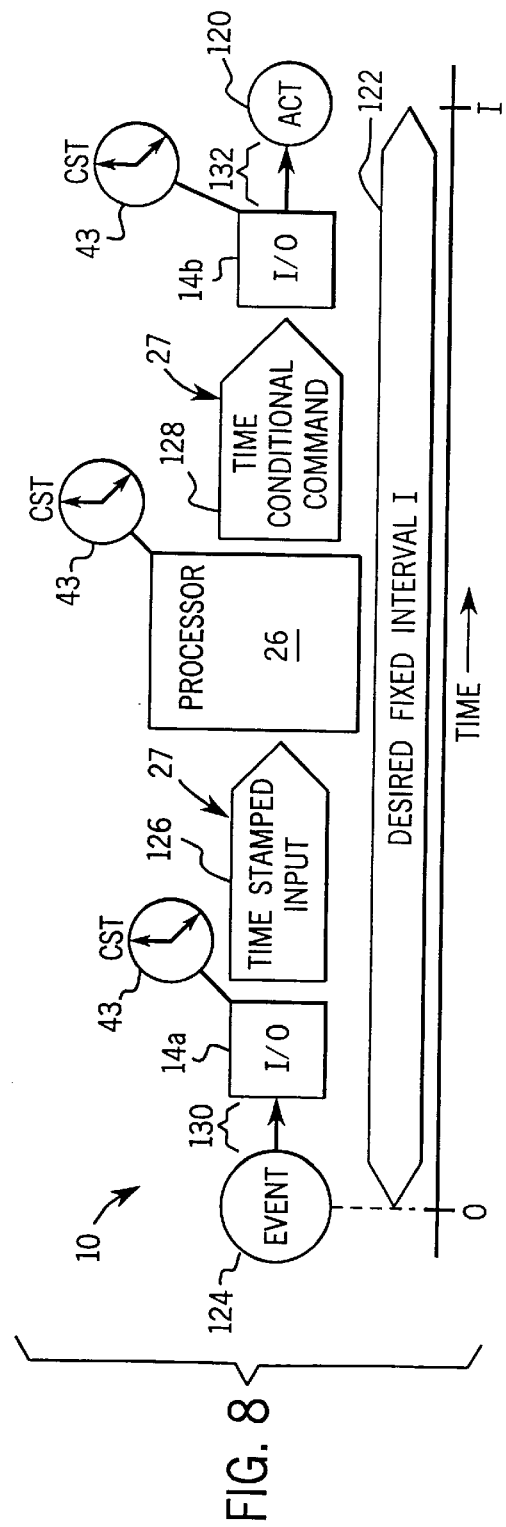
FIG. 8 is a figure similar to that of FIG. 7 showing the coordination of a control action with a prior triggering event.

Not all actions to be executed by an industrial controller at a precise time are necessarily defined with respect to a particular coordinated system time. For example, referring to FIG. 8, it may be desirable to have an action 120 performed a fixed interval 122 (designated I) after a triggering event 124. In this case the processor module 26 does not have a priori information of when the action 120 should occur, but only has the desired fixed interval I via its programming. In this case, the module 14A detecting the triggering event 124 reads its clock 43 and records a value of the coordinated system time in the message 126 transmitted to the processor module 26. The "time stamped" message 126 also identifies the triggering event 124.

The processor module 26 receiving the time stamped message 126 generates a time conditional command 128 providing instructions to I/O module 14B to perform action 120 at an execution time T equal to the sum of the time recorded in the time stamped message 126 and the desired fixed interval I.

If at the time the processor module 26 transmits the time conditional command 128, the maximum link delay D plus the current coordinated system time is greater than the time recorded in the time stamped message 126 plus the interval time I, the action 120' may be ensured to occur at the proper delay I. Otherwise, processor module 26 may transmit an error message to the user indicating that action 120' is unlikely to be executed in a timely manner. Thus the present invention also provides a clear indication that the desired time and goals have not been met.

Note that this use of a coordinated system time does not eliminate acquisition delays 130 between the event 124 and the I/O module 14A recording the coordinated system time value (except to the extent that these acquisition delays may be predicted and subtracted from the interval I). The same is true with the action delays 132 being the time taken for the I/O module 14B to act on the time conditional command 128 after the proper value of coordinated system time is reached. Generally these delays 130 and 132 are significantly smaller than the variations in link delay D and can be neglected.

Automatic Allocation of Timing Functions Among Modules

Importantly, the present invention provides the above described coordinated time system in an arbitrary network of modules 14 without intervention by the user of the industrial controller 10 either through additional programming, the need to make particular connections, or to provide particular connection topologies among the modules 14. A variety of different modules 14 having a clock may potentially operate in the time-master mode to provide the CST signal and mastership may change flexibly as the topologies of interconnections of the industrial controller 10 changes, for example, as additional functional modules 14 are inserted or removed. In particular, if the current time-master 31 is removed, the other modules 14 automatically redesignate another module 14 as the time-master through an arbitration process. Thus, the responsibility for ensuring the coordination of time is shared by many modules, increasing the reliability and flexibility of the timing system.

Allocation Messages

Arbitration to select a time-master module 14 providing the CST signal is provided by the transmission of three different messages among the modules 14 via the communication links 27 and 16. Each of these messages is uniquely identified by a data header which is generally followed by one or more fields of information.

The first of these messages is an "update" message which is used to synchronize the internal clocks of the many functional modules 14 to the current CST value. Accordingly, the update message incorporates the 64 bit CST value. The update message also includes an owner key uniquely identifying the source of the CST value (i.e. the time-master module). The owner key is loaded in memory 36 at the time of manufacture of the module 14. Finally the update message includes a 16 bit quality number indicating the quality of the module 14's clock. Clocks with higher accuracy and precision have a higher quality number based on an arbitrary scale which ensures a monotonic relationship between precision and quality number.

As will be described further, the update message thus provides essential data not only in deciding which module 14 is to be the time-master, but in ensuring, to the extent practical, that the time-master provides the best available time reference.

The second message that is sent over the communication links 27 and 16 to determine mastership is an "arbitration" message which also includes the owner key and the timer quality, but that does not have the CST value. The arbitration message initiates arbitration among modules 14 that may potentially be masters, as will be described further below.

The third message that is sent over the communication links 27 and 16 to determine mastership is an "override" message which concludes the arbitration and provides an indication to other modules 14 that the source of mastership has changed. The override message also includes the CST value, owner key, and Quality value. This information is important in other modules' ability to detect failure or loss of a time-master in certain circumstances.

Operation of Functional Modules During
Arbitration Slave Modules

Figure 4:
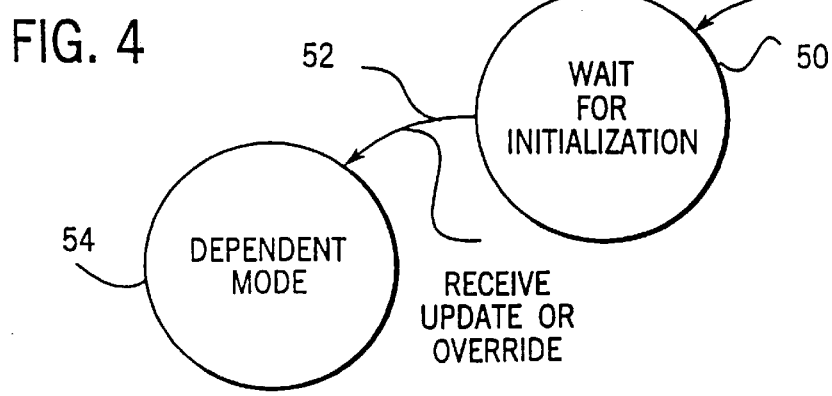
FIG. 4 is a state diagram showing the operation of a slave module of an industrial controller which may assume a dependent mode.

Referring now to FIG. 4, the slave modules are those modules 14 that do not compete to become the time-master module usually because of hardware limitations. Slave modules have the state structure: they are primarily in a dependent mode. Slave modules do not participate in the arbitration process for mastership and do not track time source quality or the owner key of the current system time-master.

As shown in FIG. 4, when power is first received by a slave module, the module enters a state 50 where it waits for an initialization of its internal timer used to track the CST value. That initialization may be in the form of a received update message or an override message indicated by state change arrow 52. After its internal timer is updated, the slave module enters a dependent mode 54 in which its internal timer is used to add to the CST value received, to provide a coordinated time until the next update message. As described above, the CST value is used to coordinate the execution of particular instructions to the slave module with instructions executed by other modules.

Master Modules

Figure 5:
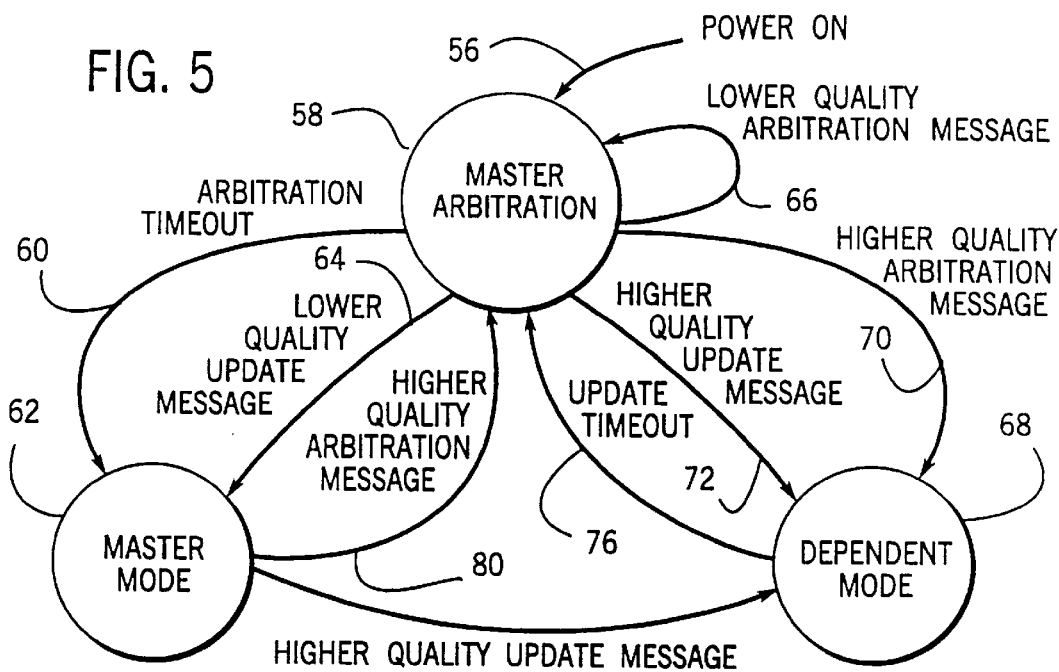
FIG. 5 is a state diagram showing the operation of a module that may assume a time-master or dependent mode.

Generally most programmable modules 14 such as processor modules 26 may be time-master modules providing the CST value to other modules 14. Referring to FIG. 5, such modules, upon receiving power as indicated by state change arrow 56 enters a master arbitration state 58 in which the module initiates arbitration to determine if it should be in the time-master mode to serve as the time-master of the industrial controller 10. In this state 58, the module 14 broadcasts the arbitration message previously described. At the same time, a timer is initiated during which rebroadcast of the arbitration message may occur or response may be received. If the timer times out prior to a response being received as indicated by state change arrow 60, the module 14 enters a time-master state 62 which assumes mastership of the industrial control network and provides periodic update messages to coordinate the other functional modules 14 as have been previously described.

In this situation, the instant module will have no prior knowledge of a CST value and will assume an arbitrary initial CST value for transmission if its previous state change was one of being powered up (i.e. state change arrow 56). If its previous state change was not that of being powered up, it may be assumed that the instant module is taking over after the failure of another time-master module. In this case, its internal CST value will be near that of the other modules 14 and that CST value is used.

The instant module also transmits an override message upon assuming state 62 indicating a change of mastership and allowing the other modules 14 to know its owner key and quality for subsequent detections of mastership failure and arbitrations.

Alternatively, the instant module may reach the time-master state 62 from the arbitration state 58 if immediately prior to the expiration of the timeout timer, it has only received update messages from other modules having lower time qualities than its own time quality. As represented by state change arrow 64, the instant module then broadcasts an override message indicating a change of mastership to itself and providing its ownership key. This situation will arise when a new module having superior time quality is inserted into an industrial controller 10 as may occur in a repair or upgrade of the controller.

When the instant module is in the arbitration state 58, it may also receive an arbitration message indicating a source of lower time quality than the instant module. As represented by state change arrow 66, in this case, the instant module remains in the arbitration state 58 but transmits its own arbitration message to inform that other module of its superior time quality. As will be described, this action causes that other module to enter a dependent mode.

When in the master arbitration state 58, the receipt of an arbitration message from a source of higher quality time than the instant module will cause the instant module to exit the arbitration state 58 and enter the dependent state 68 via state change arrow 70. In the event that the quality associated with an arbitration update message is identical to that of the instant module and thus it is largely a matter of indifference which module assumes mastership, the ownership key is next evaluated and used as a tie breaker with the module with the higher ownership key being treated as if it were a higher quality source and the module with the lower ownership key being treated as if it were the lower quality source.

The instant module may also move from the master arbitration state 58 to the dependent mode 68 upon the receipt of a higher quality update message from another module as indicated by state change arrow 72.

In the dependent mode 68, the module acts largely like a slave module in state 54 receiving update messages and updating its internal clock appropriately. In contrast to the slave module as previously described, however, a module that is capable of being a time-master monitors the network to ensure that there has not been a failure of the time-master currently in place. In the preferred embodiment, this failure is detected by monitoring the period of time between update messages from the time-master. If that period exceeds a predetermined period of approximately one second, a time-master failure is indicated and the instant module moves from the dependent state 68 to the master arbitration state 58 via state change arrow 76. Implicitly other modules are doing the same, each transmitting an arbitration message as has been previously described and receiving other arbitration messages until only that master with the highest quality timer remains and moves to time-master state 62.

In the time-master state 62, the instant module also monitors messages to detect whether a new master is introduced into the network having a higher quality. This new master may be detected either by the transmission of an update message from that new master having a higher quality, in which case the instant module moves from the time-master state 62 to the dependent mode 68 as indicated by state change arrow 78. Alternatively, the module in the time-master state 62 may receive an arbitration message from a higher quality source. In this case it cannot be assumed that the higher quality source has a current value of the CST and hence the time-master module immediately transmits an update message so as to provide a value of the CST to a potentially new time-master entering the network and moves to the master arbitration state 58 indicated by state change arrow 80 to allow for orderly transference of mastership through the arbitration process including the sending of the necessary override messages by the new time-master.

Communication Modules

Communication modules 24 cannot be time-master modules but can serve as a local master for a single bus 16. As such they participate in an arbitration process.

Figure 6:
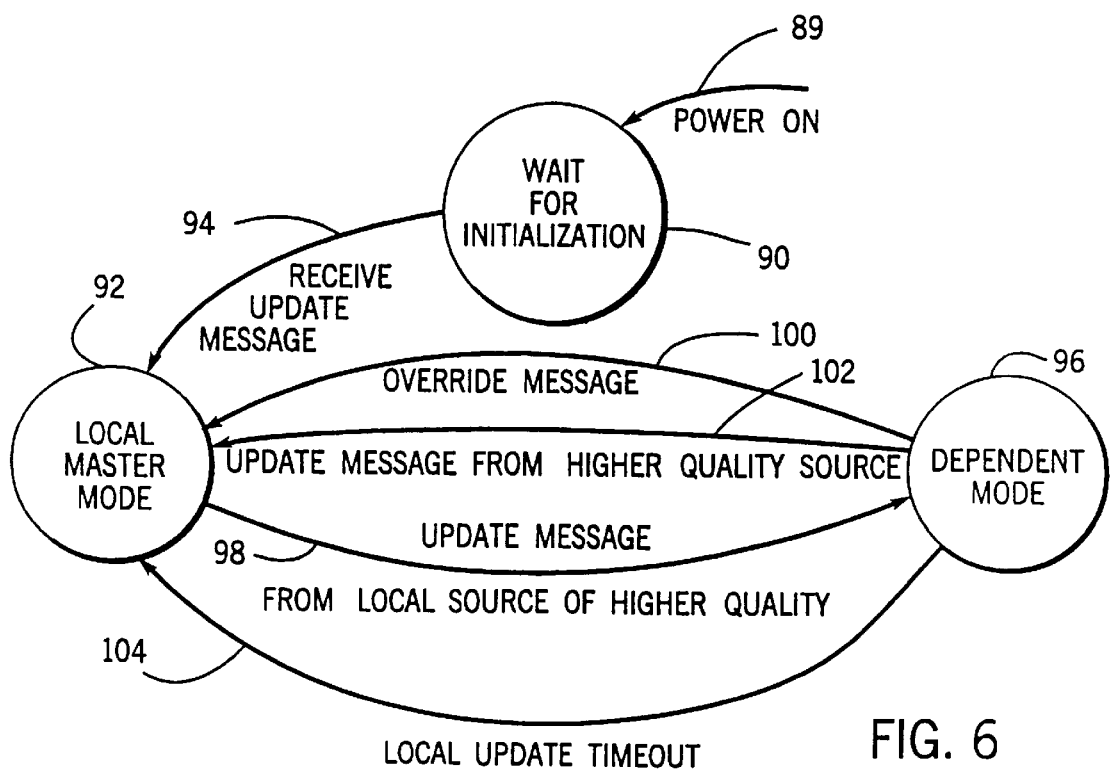
FIG. 6 is a state diagram showing the operation of a communication module that may assume a local master or dependent mode.

Referring now to FIG. 6, like a slave module, the communication module, upon the occurrence of "power on" (arrow 89) enters a wait-for-initialization state 90. In the wait-for-initialization state 90, the communication module has not received a CST value and therefore has no knowledge of the current time. In the wait-for-initialization state 90, the communication module forwards all arbitration messages received at one port on one communication link 27 or 16 to its other communication link 27 or 16 so that they may be received by other masters in the industrial controller 10.

Once an update message has been received, the communication module 24 moves to a local master mode 92 as indicated by state change arrow 94. Upon receipt of this update message, the CST value of the message is loaded into the communication modules' internal timer and the owner key number and quality of the source of the update is stored in memory 36 (See FIG. 2). The update message is then relayed to the other communication links 16 or 27 attached to the communication module 24. The module then proceeds to local master mode 92.

As noted briefly above, in the local master mode 92, the communication module may provide additional time synchronization signals to selected other functional modules 14 on one or more of its communication links. Thus, modules acting as time-master, bridges, and dependent modules may range widely in quality of the internal clock. The dependent modules having low quality clocks which need frequent updating to maintain synchronism can be provided with frequent update signals from a superior clock of a communication module acting as a local master. This local master can in turn be provided with the less frequent updates of the CST value of a time-master module.

Ideally, only one communication module 24 is a local master providing update messages to dependent modules of the industrial controller 10. Accordingly, the communication modules arbitrate among themselves to determine local mastership.

In local master mode 92, if a communication module receives an update from a communication link 27 or 16 to which it normally transmits update messages, and if that update message indicates a quality greater than that of the instant communication module, the communication module moves from the local master mode 92 to a dependent mode 96. In dependent mode 96, the module receives update messages but does not retransmit those messages and thus acts largely like a slave module or master module in a dependent mode as has been previously described. In this manner the module relinquishes local mastership to a superior time source or another communication module relaying from a superior time source.

As before, in the event that the timer qualities between the communication module and the receive message are equal, the owner key is referred to. Unlike the master case, however, because the communication modules are not transmitting their own update messages with their own owner keys but are merely transmitting another's update message downstream, it is possible that a communication module will receive an update message with the identical time quality as its own and an identical owner key. Since each owner key is unique to a given source module, this state of affairs indicates that the topology of the industrial controller 10 includes a loop and the communication module is simply hearing an "echo" of the update message from its source. This echo is simply ignored.

Note that generally, the communication modules transmit information in both directions from one communication link 27 or 16 to any of a number of other communication links and for any given received message, that message is retransmitted on the other remaining communication links. The links to which messages are retransmitted by a communication module will be termed the downstream communication links but it must be recognized that this status changes continuously and is dependent entirely on a particular communication link from which a message is received. Thus any link connected to a communication module may, at a given instant, be a downstream link and moments later be an upstream link.

Accordingly by monitoring the update messages received and the communication link on which they are found, multiple communication modules serving a given communication link may defer to a single local master.

Once the communication module moves into dependent mode 96 as caused by the receipt on a downstream communication link of an update message with a superior time quality, the communication module remains in that mode until the occurrence of one of three events. The first is a receipt of an override message indicating a change of mastership as the result of the previously described arbitration procedure and as indicated by state change arrow 100. When such a message is received, the communication module reverts to the local master mode 92 to compete for local mastership as indicated by state change arrow 100.

Second, if, when in the dependent mode 96, an update message is received from a communication link to which the communication module does not normally transmit update messages (upstream), and that update message has a different quality than that of the source normally providing CST values to the instant communication module, then the communication module assumes that a new time-master has been designated in the industrial controller 10 and it resumes local master mode 92 per state change arrow 102. In this case, if the received update message is of lower quality than the current CST source to the communication module, then the communication module broadcasts an update message with the ownership key of its current source backward (upstream) towards the direction of the received messages so as to trigger the new master to move to a dependent mode as has been described. On the other hand, if the new update message has a higher quality than that currently being relayed by the communication module, then the communication module records the new owner key and forwards the new update message downstream to its other attached communication links.

Finally, if, as indicated by state change arrow 104, the communication module in the dependent mode 96 detects a failure to receive the periodic update messages (indicating a failure of the time-master) it returns to the local master mode 92 to renegotiate for local mastership of a given communication channel based on an anticipated new mastership.

Elimination of Ripple in the CST Signal

Referring again to FIG. 3, a communication module may impose a significant delay between the time when it receives an update message and its retransmission of that update message along the communication links that it serves as a local master. The delay of processing by a communication module potentially can cause considerable skew in the time values received by dependent modules served by that communication module. The present invention further contemplates a reduction of this skew by starting an internal timer in the communication module when an update message is received by communication module so as to accumulate time all the way until access is granted to a downstream communication link on which the update message is to be retransmitted. Immediately upon the grant of access to the downstream link, the accumulated time is added to the received CST time value and this sum is retransmitted. The retransmitted CST value, although differing from that received, better reflects the actual CST value at that given time. In this manner, skew caused by processing time of the communication modules can be all but eliminated.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A method of executing at least two control actions with an industrial controller at an execution time T, the actions performed by at least two spatially separated input/output modules of the industrial controller, the input/output modules connected to the industrial controller by a communication link having a variable transmission delay D, the method comprising the steps of:
    (a) establishing a synchronized coordinated system time-base providing a substantially identical system time at each of the input/output modules;
    (b) transmitting from the industrial controller on the communication link to the first and second input/output modules, a time conditional command carrying the execution time value T; and
    (c) programming the first and second input/output modules to perform the control action after receiving the time conditional command but not until the system time has attained a predetermined mathematical relationship to the execution time T.

2. The method of claim 1 wherein the predetermined mathematical relationship of step (c) is that the system time equals the execution time T.

3. The method of claim 1 wherein the predetermined mathematical relationship of step (c) is that the system time is greater than the execution time T.

4. The method of claim 1 wherein the predetermined mathematical relationship of step (c) is that the system time is greater than the execution time T and equal to the execution time plus an integer multiple of a predetermined periodic interval.

5. A method of executing at least two control actions with an industrial controller at an execution time T, the actions performed by at least two spatially separated input/output modules of the industrial controller, the input/output modules connected to the industrial controller by a communication link having a variable transmission delay D, the method comprising the steps of:
    (a) establishing a synchronized coordinated system time-base providing a substantially identical system time at each of the input/output modules;
    (b) transmitting from the industrial controller on the communication link to the first and second input/output modules, a time conditional command carrying the execution time value T; and
    (c) programming the first and second input/output modules to perform the control action after receiving the time conditional command but not until the system time has attained a predetermined mathematical relationship to the execution time T
    including the step (d) of generating an error message to the user when, at the time of transmission of step (b), D plus the system time value is greater than the execution time T.

6. The method of claim 1 wherein the step (a) of establishing a synchronized coordinated system time-base includes the steps of;
    (i) providing each input/output module with a local clock;
    (ii) synchronizing the local clocks with messages transmitted on the communication link.

7. A method of executing a control action by an industrial controller at a predetermined interval I after the occurrence of a triggering event, the control action performed by a first input/output module and the triggering event detected by a second input/output module spatially separated from the first input/output module, the input/output modules connected to a controller by a communication link having a variable transmission delay D, the method comprising the steps of:
    (a) establishing a synchronized coordinated system time-base providing a substantially identical system time at each of the input/output modules;
    (b) transmitting on the communication link a time stamped message from the second input/output module after detection of the triggering event at the second input/output module, the time stamped message indicating the occurrence of the triggering event and containing a recorded system time equal to the system time at the moment of detection of the triggering event by the second input/output module;
    (c) receiving at the controller the time stamped message and transmitting to the first input/output module a time conditional command carrying an execution time value T equal to the sum of the recorded system time and the predetermined interval I; and
    (d) executing the control action at the first input/output module after the first input/output module receives the time conditional command but not until the system time has attained a predetermined mathematical relationship to the execution time value T.

8. The method of claim 7 wherein the predetermined mathematical relationship of step (d) is that the system time equals the execution time T.

9. The method of claim 7 wherein the predetermined mathematical relationship of step (d) is that the system time is greater than the execution time T.

10. A method of executing at least two control actions with an industrial controller at an execution time T, the actions performed by at least two spatially separated input/output modules of the industrial controller, the input/output modules connected to the industrial controller by a communication link having a variable transmission delay D, the method comprising the steps of:
    (a) establishing a synchronized coordinated system time-base providing a substantially identical system time at each of the input/output modules;

(b) transmitting from the industrial controller on the communication link to the first and second input/output modules, a time conditional command carrying the execution time value T; and (c) programming the first and second input/output modules to perform the control action after receiving the time conditional command but not until the system time has attained a predetermined mathematical relationship to the execution time T including the step (e) of generating an error message to the user from the controller when, at the time of transmission of step (c), D plus the system time is greater than the recorded system time plus the predetermined interval I.

11. The method of claim 7 wherein the step (a) of establishing a synchronized coordinated system time-base includes the steps of;

(i) providing each input/output module with a local clock;

(ii) synchronizing the local clocks with messages transmitted on the communication link.

* * * * *